United States Patent Office 3,545,258
Patented Dec. 8, 1970

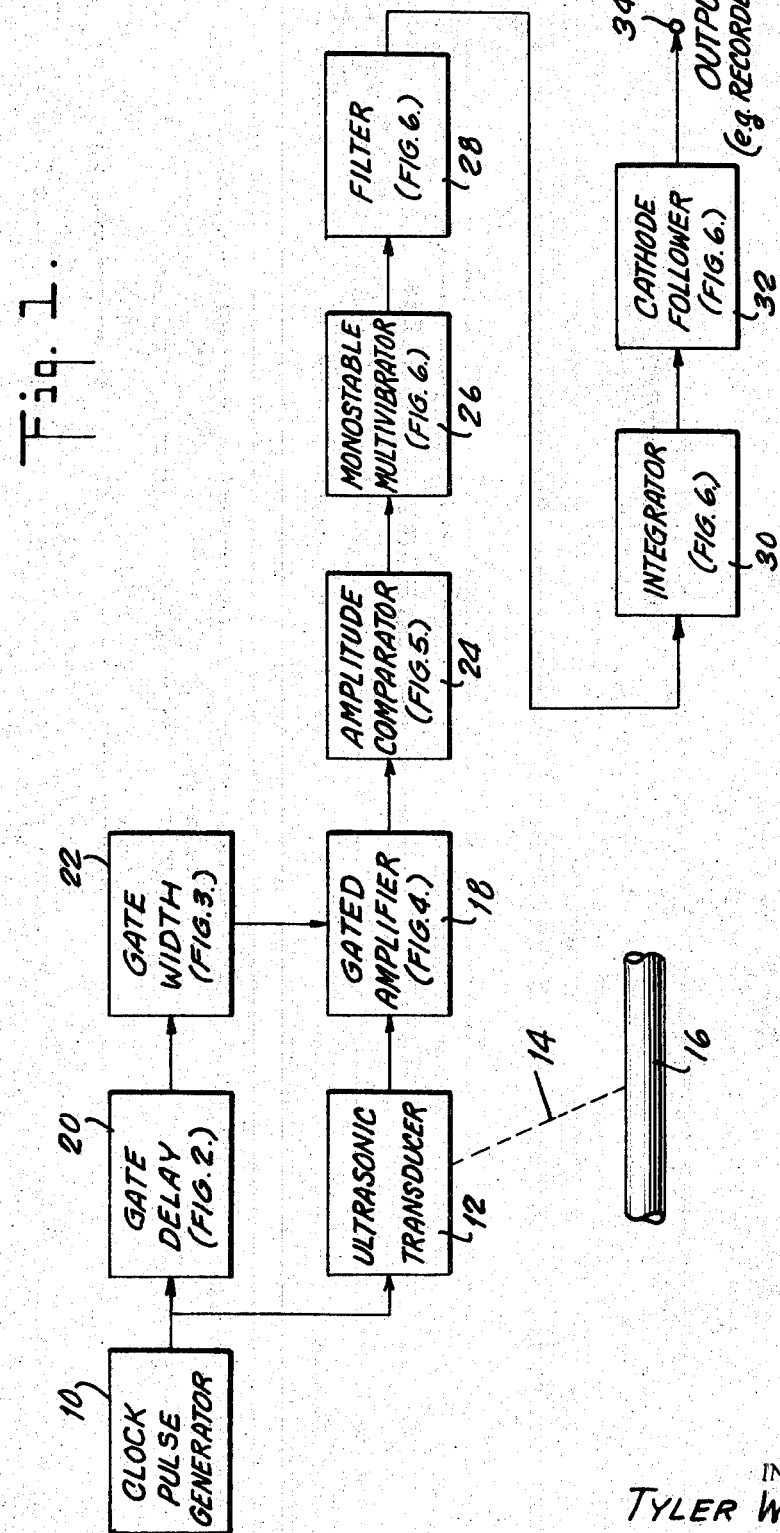

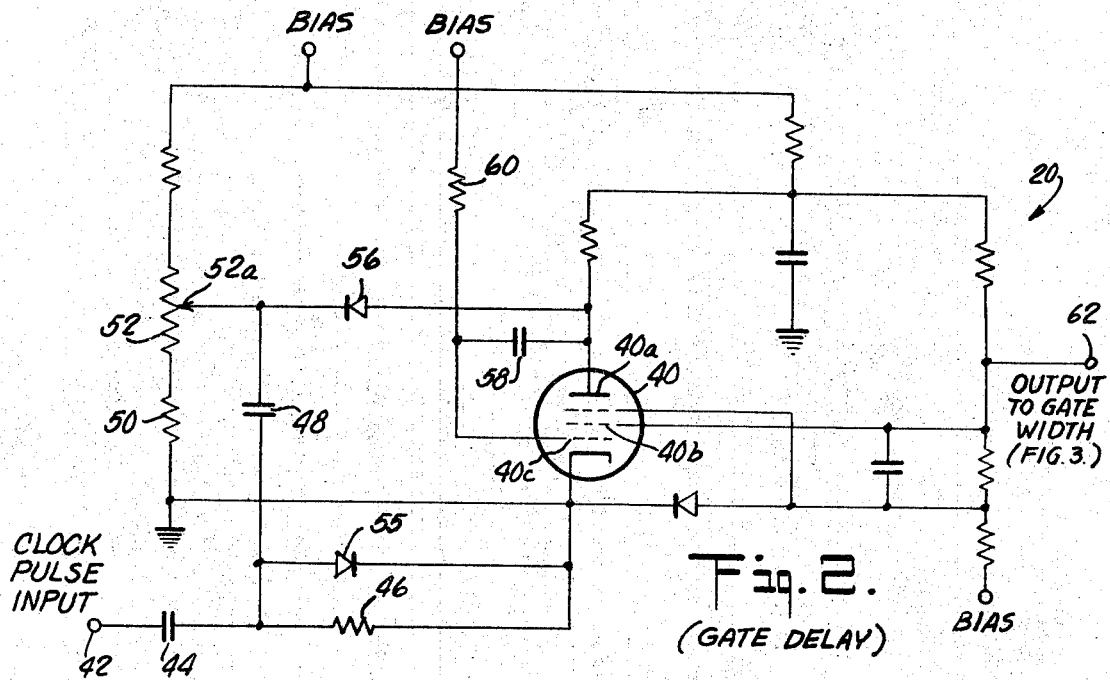
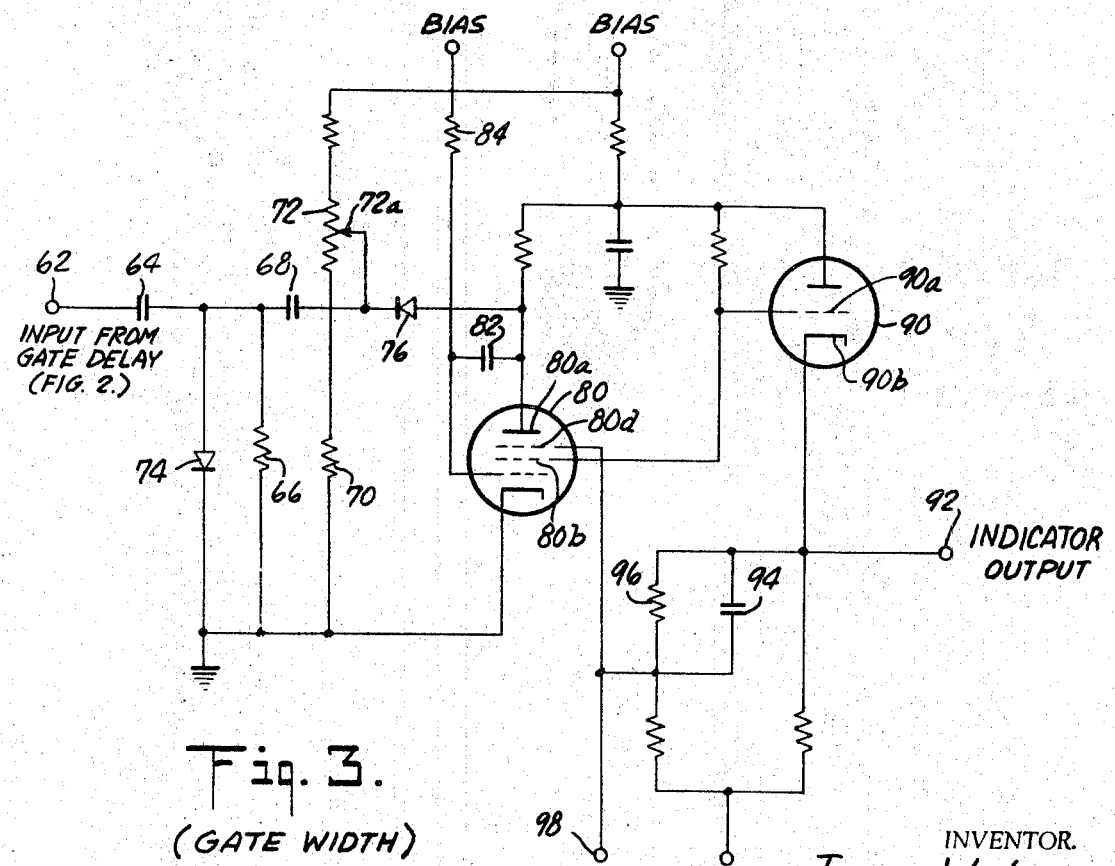

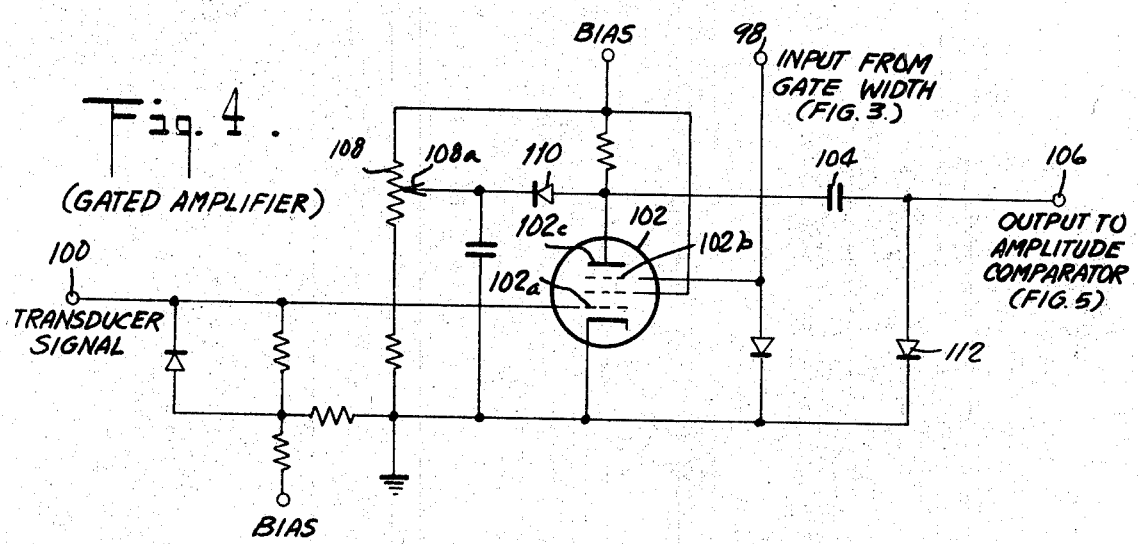
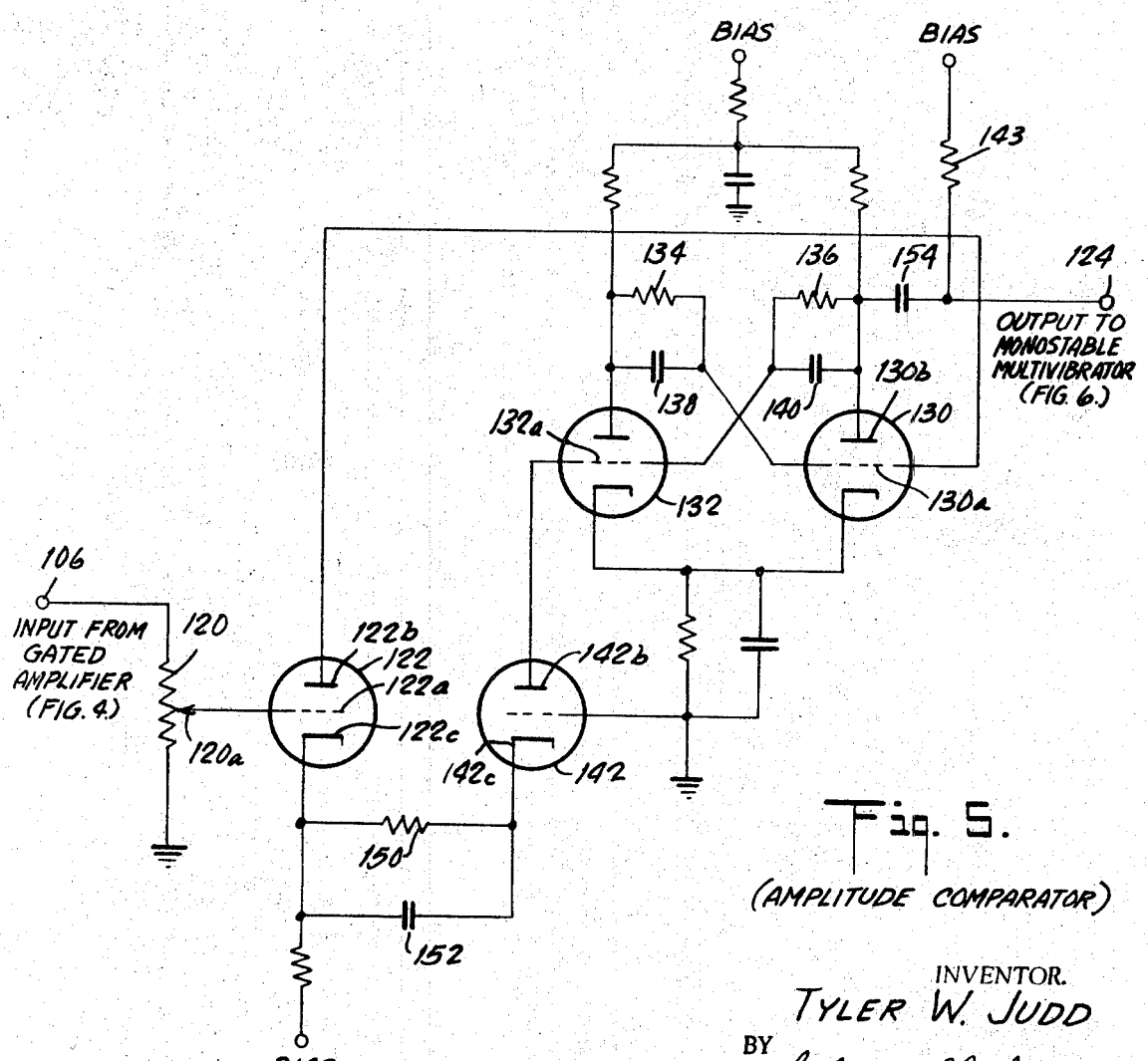

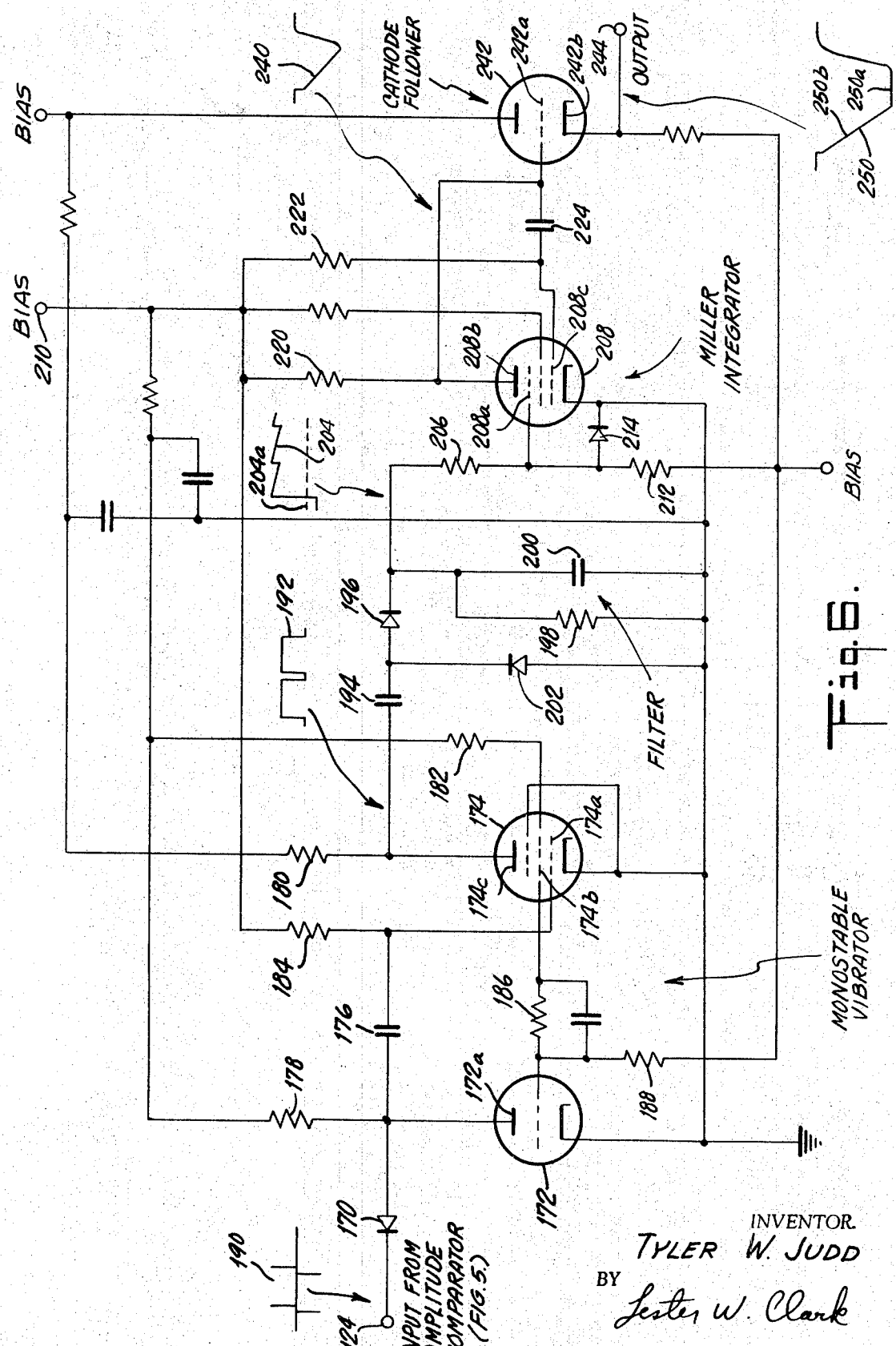

3,545,258
SIGNAL GENERATING APPARATUS AND METHOD
Tyler W. Judd, Chardon, Ohio, assignor to Republic Steel Corporation, Cleveland, Ohio, a corporation of New Jersey
Filed Sept. 1, 1966, Ser. No. 581,417
Int. Cl. G01n 29/04
U.S. Cl. 73—67.9                                5 Claims

ABSTRACT OF THE DISCLOSURE

Method and apparatus for generating a signal representative of the duration of a series of discrete pulses. In response to a series of any number of discrete pulses a single pulse is generated whose duration is the same as that of the series of discrete pulses. This single pulse is integrated to provide an output signal the amplitude of which is representative of the duration of the series of discrete pulses. The single pulse may be generated by a multivibrator which generates pulse signals, each of which corresponds to an individual one of the discrete pulses and which is of a duration slightly less than the elapsed time between consecutive ones of the discrete pulses. The pulse signals may be filtered to generate the single pulse.

---

This invention relates to the generation of signals. More particularly, the invention provides for the generation of a signal representing the duration of a series of discrete pulses. The invention has particular application to the generation of a signal representing the duration of a series of discrete pulses received as "echo signals" from an ultrasonic transducer scanning a workpiece for flaws, in which the series of pulses represents a flaw within the workpiece.

In the ultrasonic testing of materials for flaws, a workpiece is scanned by a pulsed ultrasonic beam directed into the workpiece from an ultrasonic transducer. The workpiece and the ultrasonic transducer are given relative movement so as to cause the scanning action. When the ultrasonic beam encounters a flaw within the workpiece, ultrasonic pulse signals are reflected back to the transducer to cause the transducer to generate a series of pulse signals corresponding to these "echoes" received from a flaw. The length of the defect is represented by the duration of the "echo" signals.

In order to provide a visual record of flaw length, the detected echo signals are typically shown on a strip chart recorder. The recorder must advance at a relatively high speed in order to provide distinguishable indications of different flaw lengths. With high chart speeds, however, a great deal of chart paper is required to represent the entire length of the workpiece being tested, which is cumbersome as well as expensive.

In the present invention a signal is developed representative of the duration of a series of discrete pulses and which may be shown on a chart recorder to distinguish series of different durations without requiring excessive chart speed. This is accomplished by providing a single pulse having a duration corresponding to the duration of the series of pulses, and integrating the single pulse to provide a signal having a parameter, e.g. amplitude, representative of the duration of the series.

Accordingly, an object of the present invention is to provide for the translation of a series of discrete pulses into a single signal corresponding to the duration of the series.

A further object of the present invention is to provide for improved ultrasonic testing.

Another object of the invention is to provide for improved flaw indication in an ultrasonic testing system.

These and other objects of the present invention are carried out, as noted above, by developing a single pulse signal having a duration corresponding to that of the series of discrete pulses and which is integrated to provide a representation of the duration of the series. A single pulse signal is advantageously developed from the series of pulses by the generation of a series of pulse signals, e.g. by a multivibrator, each pulse signal of which is of a duration of slightly less than the elapsed time between consecutive discrete pulses in the series. These pulse signals are then filtered so as to generate a single pulse signal which is thereafter integrated.

The invention will be more completely understood by reference to the following detailed description.

In the accompanying drawings:

FIG. 1 is a block diagram of a representative system embodying the invention.

FIGS. 2 to 6 are schematic circuit diagrams of different ones of the components shown in block diagram form in FIG. 1.

Referring to FIG. 1, a clock pulse generator 10 generates a series of timing pulses which are applied to an ultrasonic transducer 12. The ultrasonic transducer develops a pulsed ultrasonic beam represented by the dashed line 14 which scans a workpiece 16 such as a pipe. The workpiece 16 and the transducer 12 are given a relative movement, typically by moving the transducer along the workpiece, to achieve the scanning action. Signals are reflected from the workpiece 16 back to the ultrasonic transducer 12 whenever the scanning beam 14 encounters a discontinuity in the workpiece. Such signals, along with those generated by the transducer in response to the timing signals generated by the clock pulse generator 10, appear as output signals from the transducer which are coupled to a gated amplifier 18.

The gated amplifier provides a gating interval so as to pass only those signals from the ultrasonic transducer representative of "echo" signals from a flaw within the workpiece. This is achieved by providing a gating interval which follows each pulse signal directed by the transducer into the workpiece 16. The gating interval is provided by a gate delay 20, which is energized by the timing signals from the clock pulse generator 10, and by a gate width 22. The gate delay 20 generates a signal at a predetermined time after the receipt of each timing signal received from the clock pulse generator 10. The gate delay in turn energizes the gate width 22 to generate a pulse signal of a duration corresponding to the desired gating interval. Thus the gating signal commences at the predetermined time after each timing signal from the clock pulse generator 10 and persists for a time corresponding to the gating interval. Signals from the gate width 22 are applied to the gated amplifier 18 to enable that amplifier so that it only passes signals from the transducer 12 during the gating interval.

Signals from the gated amplifier 18 are applied to an amplitude comparator 24 which generates a pulse signal in response to each input pulse from the gated amplifier 18 that is greater than a predetermined threshhold magnitude. Output signals from the amplitude comparator are applied to a monostable multivibrator 26 which generates a pulse signal of a predetermined duration and amplitude from each pulse signal generated by the amplitude comparator. The duration of each multivibrator pulse signal is chosen so that it is slightly less than the time that elapses between consecutive signals generated by the amplitude comparator 24. Thus the monostable multivibrator 26 generates a series of pulses which are closely spaced in time. Pulses from the monostable multivibrator are applied to a filter 28 which filters the pulse signals from the monostable multivibrator so as to generate a single pulse signal of fairly uniform magnitude persisting for approximately the time during which signals are generated by the monostable multivibrator. The signal from the filter 28 is integrated by an integrator 30 to generate an output signal having a parameter, e.g. amplitude, representative of the duration of the signal from the filter 28. The integrator 30 is coupled through a cathode follower 32 to an output terminal 34, which may represent the input of a recorder such as a strip chart recorder. Cathode follower 32 serves to match the output impedance of the integrator 30 with the input impedance of the device, e.g., strip chart recorder, connected to the output terminal 34.

In this fashion the integrator signal provides an indication of the duration of the series of pulses, e.g., received from an ultrasonic transducer and representative of a flaw within a workpiece under inspection. The signal from the integrator has a parameter other than time, e.g., amplitude, which is representative of the duration of the series of pulses. In this fashion, and when a strip chart recorder is employed, chart speed may be relatively slow and yet pulse series of different durations may be may be easily indicated (e.g., by lines of different amplitudes on the chart) which are readily distinguishable to the eye.

FIGS. 2–6 are schematic circuit diagrams of the various components shown in block diagram form in FIG. 1. The specific circuits shown are representative and should not be taken as limiting the invention.

The clock pulse generator 10 of FIG. 1 has not been shown in detail inasmuch as this is any typical circuit which generates pulses on a timed basis suitable for energizing an ultrasonic transducer.

FIG. 2 shows a representative circuit for the gate delay 20 of FIG. 1. A pentode tube 40, which may be a 6AS6 type, is connected in a circuit as a screen-coupled phantastron. Such a circuit is described in Landee, Davis and Albrecht, Electronic Designers' Handbook (McGraw-Hill Book Company, 1957), section 9.2., e.g. Signals from the clock pulse generator 10 of FIG. 1 (assumed to be negative pulses) are applied to a terminal 42 in the circuit of FIG. 2. A first capacitor-resistor combination (capacitor 44, resistor 46) and a second capacitor-resistor combination (capacitor 48, resistor 50 and the portion of variable resistor 52 between the variable contact 52a and the end of the resistor common to the resistor 50) serve to double differentiate the input pulse signals applied to the terminal 42 to provide a series of sharply defined input pulses for triggering purposes. Diode 55 permits only negative pulses to pass from the first capacitor-resistor combination to the second such combination. Negative pulses pass through a diode 56 and are coupled to plate 40a of the pentode 40. The circuit operates in one of two modes: (1) principal conduction through the plate 40a, or (2) principal conduction through the the screen grid 40b. The circuit is biased so that the pentode 40 is normally in the screen grid mode of conduction.

Each negative pulse applied to the plate of the tube 40 shifts conduction from the screen grid to the plate. (The screen grid potential increases.) A capacitor-resistor combination (capacitor 58 and resistor 60) serves as one timing element for the circuit to determine the length of time that the tube 40 can conduct in its plate current mode of operation before it returns back to the screen grid current mode of operation. (The screen grid potential decreases.) Additionally, the potential at contact 52a affects the circuit timing by controlling the initial charge on capacitor 58. Thus variable resistor 52 provides a convenient method for adjusting the period of the circuit. The potential at the green grid 40b is a pulse (positive) commencing roughly at the time of occurrence of one of the timing pulses at the clock pulse input terminal 42 and of a duration determined by the time constant of the capacitor 58-resistor 60 combination and the setting of variable resistor 52. This pulse appears at output terminal 62 which is connected to the gate width circuit 22.

Referring to FIG. 3, the pulse appearing at the input terminal 62 from the gate delay circuit of FIG. 2 is acted upon by a first capacitor-resistor combination (capacitor 64, resistor 66) and a second capacitor-resistor combination (capacitor 68, resistor 70 and the portion of variable resistor 72 between contact 72a and the portion of the resistor common with resistor 70) which serve to double differentiate the pulse from the terminal 62. Diodes 74 and 76 ensure that only a negative pulse is passed by the capacitor-resistor combinations to plate 80a of pentode 80. The pentode is connected in a phantastron circuit similar to the circuit of FIG. 2. Thus the normal mode of conduction is via screen grid 80b. A capacitor-resistor combination (capacitor 82 and resistor 84) together with variable resistor 72 serve to determine the period of conduction in the plate current mode. The negative pulse switching the pentode 80 from its screen grid current mode of operation to the plate current mode occurs at the end of the gate delay interval provided by the circuit of FIG. 2 (since that is when the gate delay pulse is negative-going). Thus a positive pulse is produced at screen grid 80b at the end of the gate delay interval and serves as a gating pulse for the overall system.

This gating pulse is applied directly to control grid 90a of a triode 90 connected as a cathode follower. An output signal appears at terminal 92 connected to cathode 90b of the triode 90. The terminal 92 may be coupled to any indicator, such as an oscilloscope, to provide a visual indication of the gating interval. The terminal 92 is also coupled through a capacitor 94 and resistor 96 to terminal 98 which serves as an output terminal to the gated amplifier 18 of FIG. 4. The output terminal 98 is directly coupled to suppressor grid 80d of the pentode 80, whose potential follows that of the screen grid to provide a pulse output signal at the terminal 98.

Referring to FIG. 4, the circuit illustrated is a gated amplifier for the purpose of amplifying and passing the ultrasonic transducer signal only during the gating interval established by the gate delay and gate width of FIGS. 2 and 3. Input terminal 100 receives signals from the ultrasonic transducer 12 of FIG. 1. Thus the input terminal 100 receives pulse signals corresponding to the energization of the transducer by the clock pulse generator 10 of FIG. 1, as well as those "echo" pulse signals generated when the pulsed ultrasonic beam in the workpiece under inspection is reflected from a flaw within the workpiece and directed back to the ultrasonic transducer. The input terminal 100 also receives signals from the ultrasonic transducer representative of echoes received when the ultrasonic beam is reflected from the sides of the pipe or weld bead. The input terminal 100 is connected directly to control grid 102a of a pentode 102. Suppressor grid 102b of the pentode is connected to the input terminal 98 which receives the gating signal from the gate width of FIG. 3. The pentode 102 serves to amplify the signal applied to the control grid only during the gating interval established by the gate width circuit. Output signals from the tube appear at plate 102c, which is coupled by a capacitor 104 to output terminal 106.

Besides amplifying and gating the ultrasonic transducer signal, the gated amplifier circuit of FIG. 4 also introduces a "pedestal" from which the amplified and gated signal extends. Means for suppressing this "pedestal" are provided by a variable resistor 108, variable contact 108a of which is connected by diode 110 to plate 102c of the pentode. The setting of the variable contact 108a determines the potential of the plate, i.e., the pedestal or base from which the output signal extends. It should be noted that diode 112 prevents the output potential at the output terminal 106 from rising above ground, and hence only negative s ignals appear at the output terminal 106.

The signal at the terminal 106 consists of a series of negative pulses corresponding to echo signals received from the ultrasonic transducer during the gating interval.

The gating interval, of course, is selected so that these signals are presentative of flaws within the workpiece under examination. The negative pulses at the terminal 106 are applied to the amplitude comparator of FIG. 5.

Referring to FIG. 5, the terminal 106 is conneced by a variable resistor 120 (via variable contact 120a) to control grid 122a of triode 122. The triode 122 is connected in a circuit which serves to provide an output pulse (at terminal 124) corresponding to each input pulse (at the terminal 106) greater than a predetermined threshold magnitude. The threshold magnitude is determined by the setting of contact 120a of the variable resistor 120.

The input pulses from the terminal 106, as applied to the triode control grid 122a, are amplified in that triode, the plate 122b of which is directly connected to control grid 130a of a triode 130. The triode 130 and an associated triode 132 are connected together in a circuit operating as a bistable multivibrator. Resistor-capacitor combinations (resistors 134 and 136 and capacitors 138 and 140) couple together the plates and grids of these triodes in typical bistable multivibrator fashion. Control grid 132a of the triode 132 is directly coupled to plate 142b of a triode 142. The cathodes 142c and 122c of the two triodes 142 and 122 are coupled together by a resistor 150 and a capacitor 152.

In the circuit of FIG. 5, the triode 122 normally conducts more heavily than the triode 142 and hence the plate 122b is at a lower potential than the plate 142b. The triode 130 normally conducts much less than the triode 132 because of the grid connections to the plates of triodes 132 and 122. If an input pulse at the terminal 106 is received greater than the predetermined threshold magnitude, the triode 122 decreases in conduction, raising its plate potential and causing the tube 130 of the bistable multivibrator to conduct more heavily. The bistable multivibrator thus switches from one of its stable states to another stable state in which the triode 130 conducts much more heavily than the triode 132.

In this fashion, each input pulse received at the terminal 106, greater than the predetermined threshold magnitude, causes the bistable multivibrator to switch states. The leading edge of the input pulse causes a first switch in states as described above, and the trailing edge of the same pulse causes the bistable multivibrator again to switch back to its original mode of operation. The circuit thus produces at plate 130b a negative pulse of constant amplitude each time the threshold is exceeded. Capacitor 154 in conjunction with resistor 143 differentiates this pulse to produce sharp spikes from its leading and trailing edges. These spikes appear at the output terminal 124.

The output terminal 124 from the amplitude comparator circuit of FIG. 5 is coupled to the circuit of FIG. 6. Signals at the terminal 124 are coupled by a diode 170 (which passes only the negative-going portion of the signals) to plate 172a of triode 172. Triode 172 is connected with a pentode 174 in a circuit serving as a plate coupled monostable multivibrator. Capacitor 176 couples together plate 172a of the triode and control grid 174a of the pentode. Resistors 178 and 180 are plate load resistors, and resistor 182 is a screen grid load resistor for screen grid 174b of the pentode 174. The coupling capacitor 176 and a resistor 184 serve as the timing elements of the circuit, determining the time during which the monostable multivibrator is in its unstable state. Resistors 186 and 188 provide D.C. cross-coupling. The output from the monostable multivibrator is taken from plate 174c of the pentode 174.

Each negative pulse from the amplitude comparator of FIG. 5 applied to the terminal 124 drops the potential of the plate 172a of the triode 172. This drop is coupled to grid 174a by capacitor 176. In this circuit the tube 172 is normally less conductive than the tube 174. The dropping of the control grid potential of the pentode 174 causes the multivibrator to switch to its unstable state in which the tube 172 conducts more heavily than the tube 174. It should be noted that the time constant of the timing capacitor 176 and resistor 184 is chosen so that the unstable state persists for a time which is slightly less than the time between consecutive negative input pulses appearing at the input terminal 124. The input pulses at the terminal 124 appear as shown in the waveform diagram 190, and the output pulses from the monostable multivibrator are shown in waveform diagram 192. In particular, negative ones of the pulses 190 are separated in time by a substantial period, whereas the pulses 192 are very closely spaced and are almost continuous.

The output signals from the monostable multivibrator are coupled through a capacitor 194 and diode 196 to a filter comprised of resistor 198 and capacitor 200. Diode 196 ensures that capacitor 200 does not discharge through the signal source, and diode 202 effectively prevents the output circuit from the monostable multivibrator (on the output side of the capacitor 194) from going below ground. The filter serves to produce a single pulse signal from the multipulse signal applied to the filter. Waveform diagram 204 shows the signal after filtering. In other words, a single pulse is developed, the duration of which is dependent upon the number of consecutive input pulses in a series of pulses provided from the scanning of a flaw, e.g.

The single pulse is applied through a resistor 206 to the suppressor grid 208a of a pentode 208 connected in a circuit as a Miller integrator. The suppressor grid 208a has appreciable control over the current flow through plate 208b. Normally the potential of the plate is equal to the bias potential applied at biasing terminal 210, inasmuch as the suppressor grid 208a is biased negatively by resistor 212, thus effecting plate current cut-off. When the potential across the filtering capacitor 200 rises above a critical level, shown as dashed level 204a in the waveform diagram 204, the suppressor grid 208a is raised above the cut-off potential. Diode 214 prevents the suppressor grid from assuming a positive potential, however. As the flow of current through plate 208b commences, the plate potential commences to fall. The plate potential is lowered only a few volts before the potential at the control grid 208c is lowered almost to cut-off (by virtue of the coupling between plate and control grid provided by capacitor 224).

This action initiates the generation of a linear sawtooth signal as follows. Capacitor 224 connected to the control grid 208c commences to discharge through resistor 222. As the capacitor discharges, the potential at the control grid 208c becomes more positive. This increases the plate current causing a further drop in the potential of the plate 20b. This drop has an effect opposite to that of the discharge current from the capacitor 224, and thus is degenerative in action. The dropping plate voltage tends to drive the control grid 208c negative; however, the plate potential cannot fall sufficiently to exceed the positive change at the grid because of the discharging of the capacitor 224, inasmuch as it is this latter positive grid potential change that caused the plate potential to fall. Hence the falling plate potential tends to counteract the effect of the discharge of capacitor 224, thereby effectively increasing the discharge time of that capacitor. This action normally continues until cessation of the series of input pulses applied to the input terminal 124 from the amplitude comparator of FIG. 5. When the input pulses cease, the potential across the filtering capacitor 200 commences to decay at a rate determined by the time constant of this capacitor and resistors 198 and 206. When the potential across the capacitor 200 falls below the critical level 204a shown in waveform diagram 204, the suppressor grid 208a of tube 208 is again at the cut-off potential, thereby causing the plate current to cease in the tube 208. At such time the plate potential returns to the potential of the bias terminal 210.

As will be noted, the output from the plate 208b of the Miller integrator is a negative extending sawtooth. The waveform is illustrated by diagram 240 in FIG. 6. The amplitude of the negative extending sawtooth is proportional to the duration of the input pulses at the terminal 124.

The output signal from the plate 208b of the Miller integrator is coupled directly to grid 242a of a tube 242 connected in a circuit as a cathode follower. Output terminal 244 is connected to cathode 242b of the tube 242 and serves to provide an output signal from the circuit. The output signal at the terminal 244 may be supplied to any conventional strip chart recorder, e.g., to provide a visual indication of the duration of the series of pulses applied to the input terminal 124.

It should be noted that, with respect to the sawtooth developed by the Miller integrator, the potential of the plate 208b can only fall to a certain potential corresponding to that at which the tube 208 is conducting with its heaviest degree of conduction. Thus, for a relatively long series of pulses applied to the input terminal 124, the plate potential may fall to its lowest value before the series of pulses has ended. In such a case the output signal at the terminal 244 will not be a sawtooth as shown by the waveform diagram 240 but will appear as shown by the waveform diagram 250. That is, the output signal will include a relatively constant portion 250a corresponding to the "bottoming out" of the potential of plate 208b. Thus, strictly speaking, the amplitude of the sawtooth potential is not representative of the duration of the series of pulses after bottoming out of the sawtooth has occurred. In such a case, the extent of the bottom portion 250a of the output signal may be determined to provide, along with the amplitude of the linear sawtooth portion 250b, an indication of the duration of the series of input pulses. In this connection, however, it should be understood that the time constant of the Miller integrator (determined by capacitor 224 and resistor 222) can be adjusted to produce an output sawtooth waveform having various slopes with respect to the sloping portion 250b shown in waveform diagram 250. Less steep slope may be employed to extend the maximum length of a pulse train that can be measured and indicated by a linear sawtooth such as that shown in waveform diagram 240. In similar fashion, the slope 250b may be made more steep so as to provide a better indication (i.e. more amplitude) of pulse trains of relatively short duration.

It will be understood that the circuits shown are susceptible of modification. Accordingly, the invention should be taken to be defined by the following claims:

What is claimed is:

1. Apparatus for generating a signal representative of the duration of a series of discrete pulses, comprising:
   (a) means for generating in response to a series of any number of discrete pulses a single pulse of substantially constant and predetermined amplitude independent of the amplitudes of said discrete pulses and of a duration substantially corresponding to the duration of said series of any number of discrete pulses, said means for generating said single pulse including multivibrator means for generating a series of discrete pulse signals, each discrete pulse signal corresponding to an individual one of said discrete pulses and of a duration slightly less than the time between consecutive ones of said discrete pulses,
   (b) filter means coupled to said multivibrator means for filtering the discrete pulse signals generated by said multivibrator means and generating as an output signal said single pulse from said series of discrete pulse signals, and
   (c) integrating means for generating a signal representative of the integral of said single pulse.

2. Apparatus useful in workpiece testing for generating a signal representative of the dimension of a region within a workpiece, comprising:
   (a) scanning means for scanning a region in a workpiece and generating a series of discrete pulses of which the number of pulses in said series corresponds to a dimension of said region,
   (b) means for generating in response to a series of any number of discrete pulses a single pulse of substantially constant and predetermined amplitude independent of the amplitudes of said discrete pulses and of a duration substantially corresponding to the duration of said series of any number of discrete pulses, said means for generating said single pulse comprising:
      (i) multivibrator means for generating a series of discrete pulse signals, each discrete pulses signal corresponding to an individual one of said discrete pulses and of a duration slightly less than the time between consecutive ones of said discrete pulses, and
      (ii) filter means coupled to said multivibrator means for filtering the discrete pulse signals generated by said multivibrator means and generating as an output signal said single pulse from said series of discrete pulse signals, and
   (c) integrating means for generating a signal representative of the integral of said single pulse.

3. Apparatus as defined in claim 2, wherein said scanning means includes:
   (a) clock pulse generator means for generating a series of timing pulse signals,
   (b) ultrasonic transducer means coupled to the clock pulse generator means and generating ultrasonic pulse signals which are directed into the workpiece, said ultrasonic transducer means generating echo signals representative of ultrasonic signals reflected from the workpiece,
   (c) means for causing relative movement between the ultrasonic transducer means and the workpiece,
   (d) gate signal generator means coupled to the clock pulse generator means for generating a gate pulse signal bearing a predetermined relation to each timing pulse signal generated by the clock pulse generator means,
   (e) gated amplifier means coupled to the gate signal generator means and to the ultrasonic transducer means for passing only those signals from the ultrasonic transducer means coinciding in time with each gate pulse signal, and
   (f) amplitude comparator means coupled to said gated amplifier means for generating an output pulse signal in response to each signal received from the gated amplifier means greater than a predetermined magnitude, said output pulse signal being applied to said multivibrator means to initiate generation of one of said discrete pulse signals by said multivibrator means.

4. A method of generating a signal representative of the duration of a series of discrete pulses, comprising the steps of:
   (a) generating in response to a series of any number of discrete pulses a single pulse of substantially constant and predetermined amplitude independent of the amplitudes of said discrete pulses and of a duration substantially corresponding to the duration of said series of any number of discrete pulses, said single pulse being generated by generating a series of discrete pulse signals, each discrete pulse signal corresponding to an individual one of said discrete pulses and being generated for a time slightly less than the time between consecutive ones of said discrete pulses,
   (b) filtering the discrete pulse signals generated to generate a single pulse output signal, and
   (c) integrating said single pulse output signal to generate a signal representative of the integral of said single pulse output signal.

5. A method as defined in claim 4, wherein said series of discrete pulses is provided by scanning a region in a workpiece and generating a series of discrete pulses of which the number of pulses in said series corresponds to a dimension of the region to be determined.

References Cited

UNITED STATES PATENTS

| | | | |
|---|---|---|---|
| 2,922,041 | 1/1960 | Boyle | 328—186X |
| 3,287,963 | 11/1966 | Stanya et al. | 73—67.9 |
| 3,006,184 | 10/1960 | Goldman | 73—67.8 |
| 3,427,866 | 2/1969 | Weighart | 73—67.7 |

FOREIGN PATENTS

| | | | |
|---|---|---|---|
| 842,653 | 7/1960 | Great Britain | 73—67.9 |

RICHARD C. QUEISSER, Primary Examiner

J. P. BEAUCHAMP, Assistant Examiner

U.S. Cl. X.R.

328—1, 108, 140